United States Patent [19]

Murray et al.

[11] Patent Number: 4,880,143

[45] Date of Patent: Nov. 14, 1989

[54] DISPENSER AND COMPONENTS FOR HIGH VISCOSITY FOAM PRODUCTS

[75] Inventors: Pat L. Murray, Minooka; Robert Braun, New Lenox; Dawn McNamara, Lockport, all of Ill.

[73] Assignee: Insta-Foam Products, Joliet, Ill.

[21] Appl. No.: 260,289

[22] Filed: Oct. 20, 1988

[51] Int. Cl.⁴ .............................................. B67D 5/52
[52] U.S. Cl. ................................... 222/135; 222/145; 222/323; 222/402.11
[58] Field of Search ................... 222/135, 145, 402.11, 222/402.13, 402.15, 324, 174, 323

[56] References Cited

U.S. PATENT DOCUMENTS

| | | | |
|---|---|---|---|
| 3,158,292 | 11/1964 | O'Donnell | 222/402.11 |
| 3,303,970 | 2/1967 | Breslau et al. | 222/135 |
| 3,506,159 | 4/1970 | Müller | 222/135 |
| 3,575,319 | 4/1971 | Safianoff | 222/135 |
| 4,505,335 | 3/1985 | Hayba | 222/402.15 |

Primary Examiner—H. Grant Skaggs
Attorney, Agent, or Firm—Angelo J. Bufalino

[57] ABSTRACT

An improved dispensing gun for receiving and positioning a pair of aerosol containers and mixing and discharging the contents of the containers. The gun includes a combination cover unit and trigger plate pivotally affixed to a portion of a frame unit. The cover unit and trigger plate being positioned between an open, can loading position, a normally closed position and a contents discharge position. The gun also has a trigger carried by a handle and pivotably mounted for engagement with the cover unit and trigger plate. A mixing unit is also provided by the gun which includes a main body unit, a dispensing nozzle connected to the main body unit and a pair of removably positioned inlet elbows connecting the main body unit with outlets of associated aerosal can valve units.

7 Claims, 3 Drawing Sheets

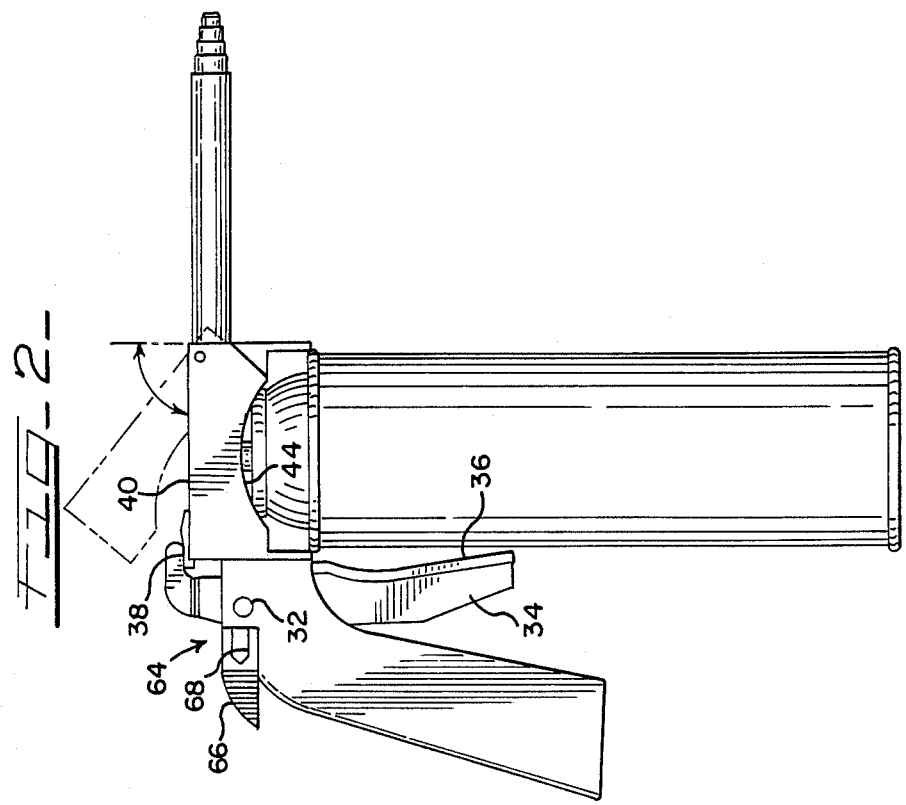
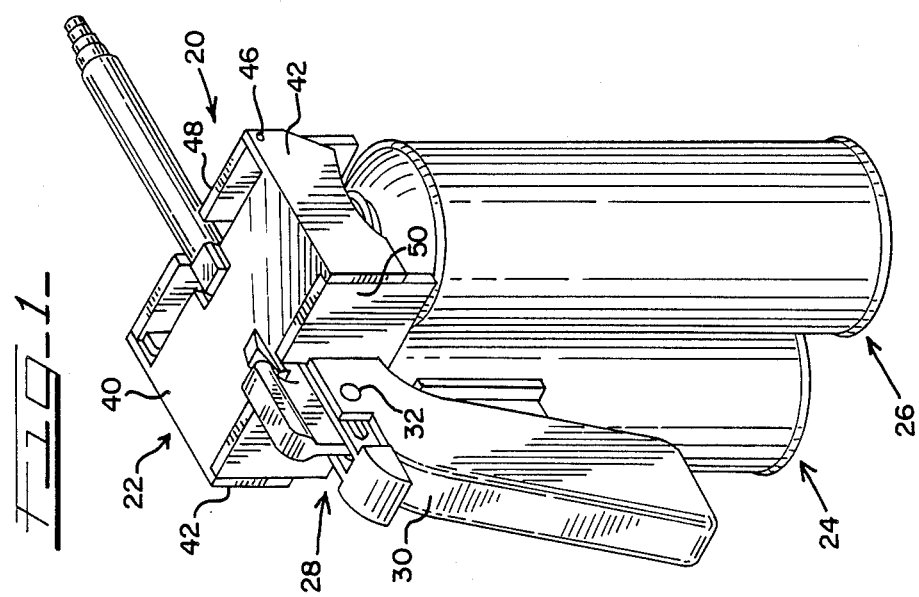

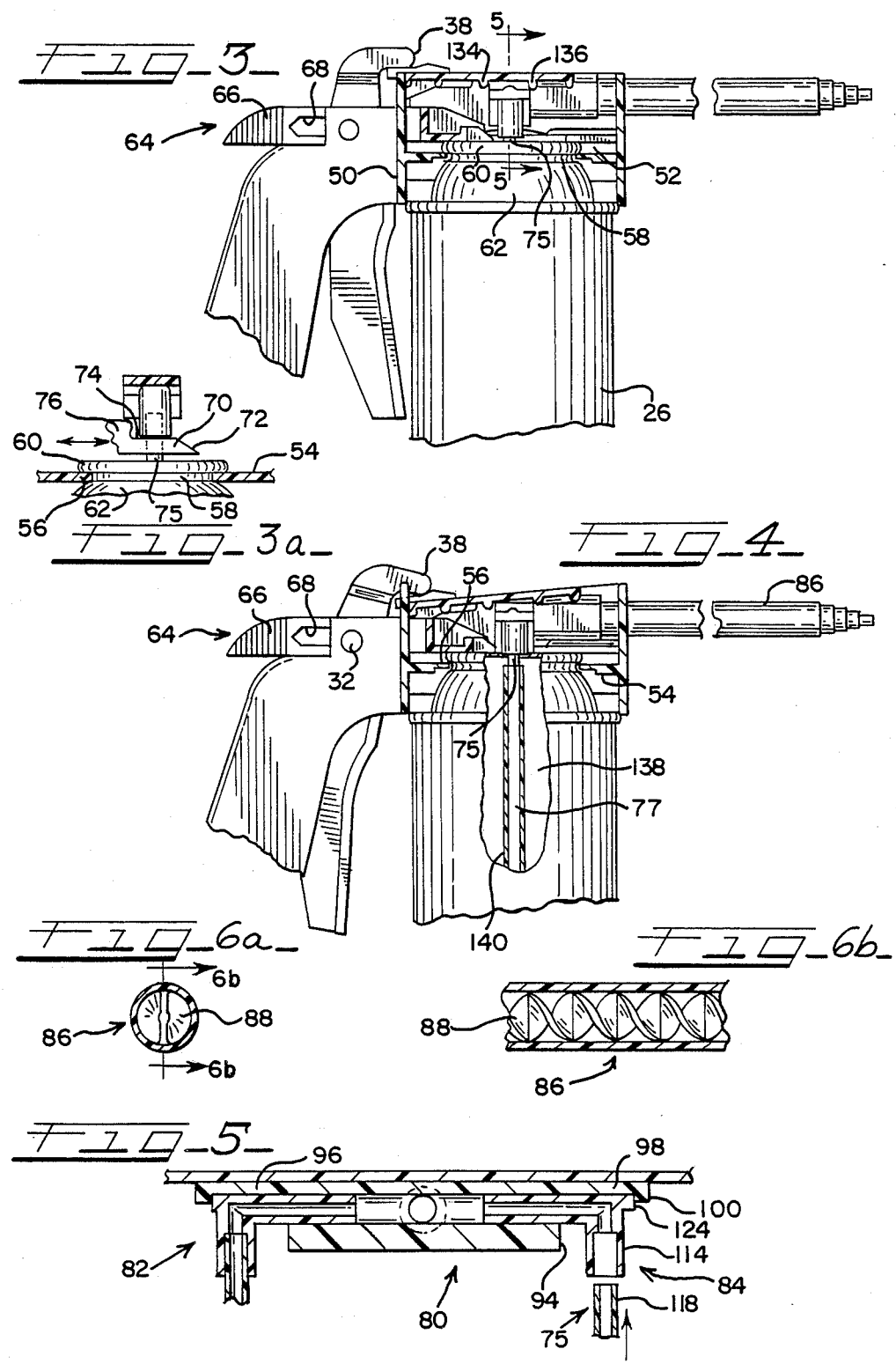

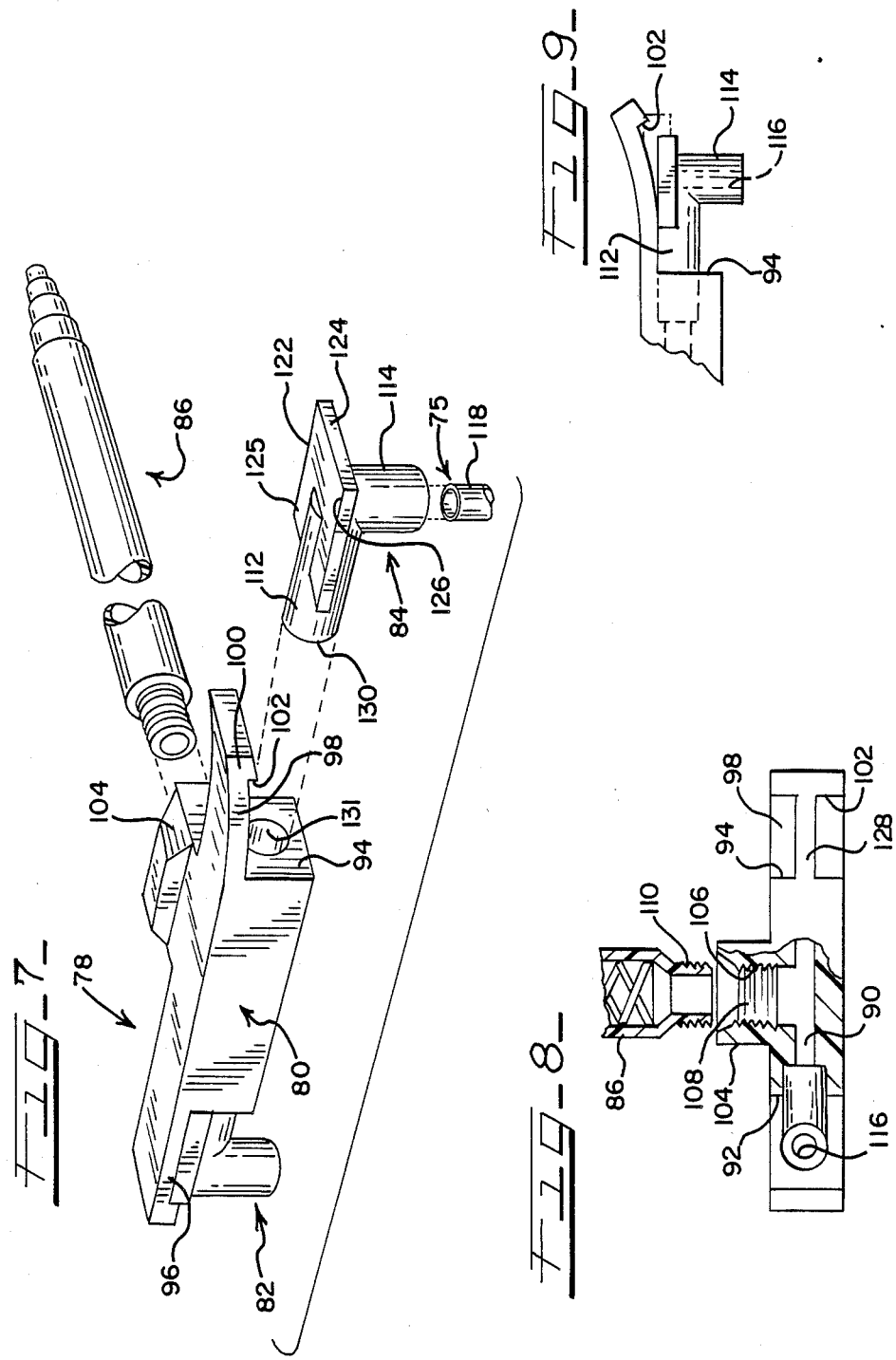

DISPENSER AND COMPONENTS FOR HIGH VISCOSITY FOAM PRODUCTS

The present invention relates generally to an improved dispensing gun for use in dispensing liquids of very high viscosity, particularly those adapted to dispense room temperature vulcanizing ("RTV") fire retardant silicone foams.

In particular, the invention relates to a dispensing gun which includes a handle, a carrier for a pair of aerosol containers, and a trigger mechanism including a transverse trigger plate acting in use to depress a rigid, integrated mixing and dispensing assembly which serves to open the container valves and mix the contents of the two containers for dispensing, as well as and providing other desirable structural and operational characteristics in use.

Each year in the United States, fires in dwellings, and in commercial and business establishments as well, take a serious toll in human life and property. One of the major problems in fire prevention and containment is that of effectively sealing off a fire to the area immediately surrounding its origin. Thus, while it may not be possible to prevent all fires, study has established that there is room for very significant improvement in the area of minimizing the effect of those fires which do occur.

A major cause of losses in both and life and property attributable to the undue spread of fires is reflected in the damage which takes place in areas which are relatively remote from the immediate area in which the fire starts. A major cause of the propagation of fire, smoke, heat, and toxic gases beyond the immediate area of the fire is transmission of combustion products through floors and walls.

Inasmuch as almost all floors and walls in modern buildings provide measurable fire resistance, and very significant fire resistance in the case of buildings conforming to current building codes, a fire will not ordinarily simply pass rapidly through walls or floors, and hence will tend to be confined to its area of origin. However, the foregoing statement is not categorically or even usually true if there are unprotected openings of measurable size in walls or floors. These openings can and do act as conduits for the spread of flames, smoke, heat and toxic gases.

While most or all building codes require that penetration holes in fire rated floors and walls be sealed with a suitable fire stop material, it has not always been the practice to conform to these codes. In some cases this is because those responsible simply do not apply sealing material as they should; there is also a significant shortcoming on the part of those who attempt to comply, but because of the nature of the fire stop material which they seek to apply, are simply unable to do so effectively.

Fire resistant materials, including silicone room temperature vulcanizing ("RTV") foam materials are among those materials which hold out significant potential for acting as highly effective fire stop materials in wall and floor penetration holes. Such materials, including those marketed by the assignee of the present application, comply with fire codes, and when properly used, are capable of helping to achieve fire ratings of one, two, or three hours, depending upon the particular application and the structure with which they are used.

These silicone-based foams, unlike purely organic foams, have excellent capabilities for stopping fire and smoke, and for maintaining the integrity of fire rated floors and walls. These materials are classified by Underwriters Laboratories as those which will act both as a fire seal and as a water seal.

Unlike other sealing materials, such as certain kinds of mortar, organic materials, and other products used to provide a fire stop, and silicone based foams are very effective because, in use, they overcome drawbacks characteristic of other materials. For example, silicone foams are not brittle and subject to cracking; they permit relative movement of the structure, because of their rubbery nature. Thus, movement of a pipe within a hole or an electrical conduit relative to an opening does not per se create a crack or break through which fire, gases or the like may pass. The materials do not crack, crumble, or become embrittled with age.

Still further, foams of the type in question may be repaired so that reentry into the sealed space may be accomplished without damage and without compromising reseal efforts. The use of foam has other advantages, in that expanding foams may be made to conform to almost any void shape. The foam materials are easy to identify and their characteristics are such that inspectors may positively and conveniently identify them as conforming to building code provisions.

These materials before being exposed to fire, are of low toxicity and hence may be handled safely. Once exposed to fire, the char which is formed by exposure, even at 2,000°, creates its own insulating effect and may absorb heat by ablation even in the stage of incipient failure.

With the known advantages of silicone foams, including those enumerated above and others, there has been an increased interest in the ability to dispense such foams under proper control by those working with building products. However, previous dispensing systems used for this purpose have lacked one or more desirable advantages and characteristics in use. In one known system, a simple container carrier and a single trigger unit have been used for dispensing, but the materials were forced to pass from the aerosol container nozzles through small, flexible hoses to a mixing nozzle. This is not entirely desirable, because although inexpensive, where the hoses were made small enough to be effectively sealed to the surrounding elements of the mechanism, their cross-sectional area was sometimes too small for effective use with high viscosity, foam-forming components.

Moreover, where the containers and the nozzles thereon were spaced apart, the degree to which each can valve was actuated was not always able to be reliably controlled by the trigger. In other words, the valve on one can might be opened more quickly or to a greater extent than that on the other can, even where the valves were operated by common trigger plate.

Still further, the ability to reliably remove and replace a nozzle and other components left something to be desired. In addition, previous designs did not always provide for the simplest and most reliable manufacture and assembly of the dispensing units consistent with economy and reliability.

Accordingly, there has been a need in this critical area for a further improved dispensing gun for mixing high viscosity components, which are able to be manufactured reliably at low cost.

There has also been a need for a dispensing gun of low cost, and especially one having a rigid mixing and dispensing assembly providing the ability to transmit valve-depressing forces through its body without undue deflection.

In view of the shortcomings of prior art dispensers for viscous, foam-forming materials, therefore, it is an object of the invention to provide an improved dispensing gun for high viscosity compositions.

A further object of the invention is to provide dispensing gun which includes a mixing and dispensing assembly having a rigid body capable of removably receiving and precisely positioning a pair of inlet elbows for the components to be mixed and dispensed through a nozzle unit.

A still further object of the invention is to provide a combination can holder and dispensing gun which is compatible with existing aerosol cans, which utilizes a novel mixing and dispensing assembly, and which makes it possible to dispense high viscosity materials effectively.

Another object of the invention is to provide a mixing and dispensing system wherein a novel aligning, positioning, and latching means is provided in a portion of the mixer body so that inlet elbows may be removably positioned in the mixer body with a minimum of difficulty.

A further object of the invention is to provide a mixing and dispensing unit which provides positive nozzle alignment and aiming, and which eliminates the need for flexible hoses or the like to connect the outlet passages from the container valves to the inlet passages in the mixer unit.

A still further object of the invention is to provide a simple and economical mixing and dispensing system wherein the initial mixing of the components takes place within a rigid body by impingement of the two separate component streams directly upon each other and wherein subsequent mixing occurs as the mixed products pass through a nozzle containing baffle means on the interior thereof.

Yet another object of the invention is to provide a design for a mixing and dispensing assembly which may be reliably and economically manufactured at low cost and assembled reliably without difficulty, and in which components may be replaced, if necessary, by reason of having been plugged during a prior use cycle, all at minimum cost to the consumer.

A further object of the invention is to provide a mixer and dispenser unit for high viscosity fire resistant foams which will enable such products to be used more widely and more reliably in order to reduce fire hazards in building structures and the like.

The foregoing and other objects and advantage of the invention are achieved in practice by providing a dispensing gun unit for aerosol containers which includes a frame unit for positioning the containers, a trigger mechanism with portions which are movable relative to the frame unit and a mixing and discharge assembly which includes a rigid body portion, a pair of readily removable, indexable elbow units able to be removably inserted in a desired position of use within the body, and wherein the mixing and discharge unit includes a rigid nozzle affixed to the body, with the mixing body being positionable for actuation by a trigger plate forming a part of the trigger mechanism.

The exact manner in which the foregoing and other objects and advantages of the invention are achieved in practice will become more clearly apparent when reference is made to the following detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 1 is a perspective view of the combination mixing and dispensing gun of the invention, showing the same in a position of use with a pair of aerosol containers suspended beneath the gun in position of use;

FIG. 2 is a side elevational view of the mixing and dispensing unit of FIG. 1, showing the trigger plate in a phantom-line raised position;

FIG. 3 is a side elevational view, partly in elevation and partly in section, showing certain constructional details of the dispensing gun of the invention;

FIG. 3(a) is an enlarged fragmentary view of a part of the trigger safety mechanism of the gun;

FIG. 4 is a sectional view similar to that of FIG. 3, showing the trigger being actuated;

FIG. 5 is a vertical sectional view of the mixing unit of the invention, showing the mixer body and removable inlet elbows;

FIGS. 6 and 6(b) show details of the dispensing nozzle of the gun of the invention;

FIG. 7 is an exploded perspective view, with portions broken away, showing the relationship of the mixer unit, the nozzle, and one of the removable inlet elbows;

FIG. 8 is a bottom plan view, with portions in section, showing certain features of the mixer unit of the invention; and FIG. 9 is a fragmentary elevational view of a portion of the mixing unit of FIG. 7, showing additional details of the snap-in latching and orientation feature used to position the inlet elbows of the mixer unit.

DESCRIPTION OF THE PREFERRED EMBODIMENTS OF THE INVENTION

While the principles of the invention may be embodied in somewhat different forms, a detailed description of a presently preferred form of mixing and dispensing unit made according to the invention will be given. Here, the containers being used are readily portable aerosol containers approximately 9 inches in overall height, and each adapted to contain some 10 ounces more or less of reactive components. The gun portion of the assembly is preferably made from plastic materials so that it may be made at low cost and discarded after one or more uses. Referring now to the drawings in greater detail, and particularly in reference to FIGS. 1–4, the invention is shown to be embodied in a combination, generally designated 20, of three main elements, namely, a mixing and dispensing gun generally designated 22 and a pair of associated aerosol containers generally designated 24 and 26 respectively. The principal components of the gun 22 include a gun frame unit generally designated 28, and shown to include a handle portion 30 adapted to be grasped by the operator. A pivot pin 32 on the handle 30 positions a trigger unit 34 for pivotable movement. The trigger 34 includes a lower, finger engaging front surface 36 and a top trigger plate actuator 38. The frame 28 of the gun 22 includes a combination can top cover and trigger plate unit 40. The trigger plate 40 includes a pair of end walls 42 each having a semi-circular recess 44 on a lower surface thereof. A pair of pins (one only shown in FIGS. 1 and 2) 46 are affixed to a part of the front plate 48 of the frame, permitting the combination cover and trigger plate 40 to swing to an open position through a range of arcuate movement as shown in FIG. 2. The handle 30 is affixed to and extends outwardly from the rear plate 50 of the frame element.

Referring now to FIGS. 3, 3(a), and 4, it is shown that the gun frame includes a forwardly extending backbone 52 and a pair of substantially identical, left and right hand can holder plate units 54, (one only shown in FIG. 3) each of which includes semi-circular inner margins 56 for engaging a groove 58 formed between the top curl 60 of the aerosol valve positioner and the dome portion 62 of the upper end of the aerosol contain 26. Hence, when the cover 40 is raised to the phantom line position of FIG. 2, for example, aerosol cans may be removed laterally of the gun 22 and replaced as pointed out.

Another feature of the gun unit resides in the trigger safety arrangement generally designated 64 and shown to include a thumb engaging, rear extension portion 66, and a slot 68 to accommodate the trigger pivot pin 32.

In referring to FIG. 3(a), it will be noted that the a forward extension portion 70 of the trigger safety 64 includes a beveled leading edge surface 72 and an inlet elbow support surface 74 disposed ahead of a trigger safety shoulder surface 76. As further shown in FIG. 3(a), the extension 70 moves between extended and withdrawn positions under the control of the operator. When the trigger safety 64 is moved forward or to the right, it assumes the position of FIG. 3(a). Here, the elbow support surface 74 prevents downward movement of the elbow, and hence, actuation of the can valve, as will appear. FIG. 3(a) also shows additional details of the groove 58 and the engagement of the margins 52 of the can holder plate units 54. In this connection, as is known to those skilled in the art, the can valves are operated by depressing the end portions 75 of the dip tubes 77.

Referring now to FIGS. 5 and 7–9, various aspects of the novel mixer assembly generally designated 78 of the invention are shown. The principal components of this assembly 78 include a main body generally designated 80, and substantially identical left and right hand inlet elbow units generally designated 82 and 84 and a dispensing nozzle generally designated 86 having a baffle unit 88 (FIG. 6b) disposed therein. As shown, the mixer unit 78 is preferably a monolithic unit having a single passage or bore 90 extending longitudinally therethrough and terminating at left and right hand end faces (92, 94 in FIG. 8) of the main body portion.

The upper portion of the main body 80 includes a pair of spring plates 96, 98 each able to be deflected upwardly through a slight range of motion by reason of its own innate resiliency. A downwardly extending, increased thickness end portion 100 includes an inwardly facing locking shoulder surface 102 which is adapted to secure the associated elbow 84 in place as will appear.

The mixer body 80 also includes a forward extension portion 104 which includes a plurality of female threads 106 forming an outlet passage 108 therein adapted to receive the threaded end 110 of the dispensing nozzle unit 86 of the invention. The innermost portion of the outlet passageway 108 intersects the transverse passage or bore 90 in the center portion of the mixer 78.

Referring now to the inlet elbows 82, 84, since these are identical, only one will be described in detail. The elbow 84 includes a horizontal tube section 112 and a vertical tube section 114, preferably having a generally cylindrical outside diameter and a circular center passageway 116 adapted to receive the outer diameter portion 118 of the aerosol container valve stem 75.

Adjacent the right angle portion of the elbow is a locating plate 122 having an end face surface portion 124 which is adapted to engage and register with the oppositely facing shoulder surface 102 on the spring plate 98. A portion 125 (FIG. 7) of the horizontal section of the elbow 84 lies slightly above the upper surface 126 of the alignment plate, and is adapted for reception in a groove 128 formed in the lower surface of the spring plate 98 (FIG. 8).

From the foregoing, it will be understood that the mixer is an assembled unit, and that each of the elbows 82, 84 may be properly aligned and positioned merely by a snap fit action which includes raising the plate 98 slightly, inserting a nose portion 130 of the elbow into the inlet opening 131 in the cylindrical passage 90 where it is retained in fluid tight relation. The groove 128 in the plate 98 aligns and interfits with the upper surface 125 of the horizontal section 112 of the elbow 84, and the spring plate shoulder locks the unit in position.

This arrangement provides three-dimensional orientation and insures not only a fluid tight fit between the elbows and the mixer, but also insures that the vertical 114 leg of each elbow is properly spaced apart from its counterpart and is truly vertical, so that it will be properly aligned with the pairs of valve stems 75 extending upwardly from the associated container. The discharge nozzle assembly 86, which includes an interior baffle 88, forms an effective static mixer for the components. The nozzle 86 may simply be unscrewed for removal.

An important feature of the invention is the relation between the trigger plate 40 and the mixer unit 78. The mixer body 80 is sufficiently rigid that when the trigger 30 is actuated, both valve stems 75 will be depressed at a substantially equal rate. This will insure mixing of the contents in the proper ratios, thus in turn insuring that the resulting foam product will cure properly and have the desired characteristics.

In use, when the mixer body is properly positioned, (FIGS. 3 and 4) it lies between stiffening ribs 134, 136 on the cover plate 40. When the trigger 34 is actuated, the actuator unit 38 pushes down on the plate 40, which pivots about the pins 46. The stems 75 are pushed down to actuate the valves, which are of a known type. The product flows from the can interior 138 through the dip tube 140 and thence to its associated elbow 82 or 84. From here the viscous liquids impinge on each other in the mixer and pass to, through, and out of the nozzle 86.

The design of the mixer in such a way as to removably accommodate the separate elbows greatly facilitates production and permits materials to be made at low cost.

By reason of the design of the unit, particularly the design of the mixer and the manner of its cooperation with the trigger plate and other elements of the dispensing gun of the invention, an improved dispensing action is provided for relatively high viscosity liquids. According to the invention, since the inlet elbow units may be removed and replaced, it is possible to provide a proper mixing proportion of ingredients if this is indicated, merely by changing to an elbow having a different inside diameter. While different materials may be used in the construction of the dispensing gun of the invention, its design makes it practical for the parts to be made, as by injection molding or otherwise, from relatively inexpensive plastic materials, whether filled or unfilled. Accordingly, the gun of the invention may be manufactured at low cost and may be sold as a throw away unit, if desired. While it is possible to throw away the entire gun unit, it is also possible for the dispensing gun to be marketed with a plurality of aerosol containers and a plurality of mixer unit and nozzle combinations, just as it is also possible to separate the nozzle from the mixer if materials become clogged in the nozzle interior. Hence, the gun is capable of reliable operation in what might be termed a semi-throwaway mode of use. In addition to foaming materials such as silicone foams, it is also possible to utilize the gun of the invention to mix other viscous liquid products such as two component adhesives or coating materials. These include epoxy or urethane materials, for example. As pointed out, the extreme structural strength provided by the rigid nature of the mixer renders the unit compatible with virtually any material which may be packed for aerosol dispensing.

It will thus be seen that the present invention describes dispensing guns, such invention has a number of advantages and characteristics, including safety, ease of use and other characteristics referred to in the foregoing specification.

Various examples of practicing the invention having been set forth by way of example, it is anticipated that variations to the described examples will occur to those skilled in the art, and that variations to the described form of invention may be made without departing from the spirit of the invention or the scope of the appended claims.

We claim:

1. An improved dispensing gun for receiving and positioning a pair of aerosol containers and mixing and discharging the contents of said containers, said gun comprising, in combination, a gun frame unit and a handle affixed to the frame for grasping by the user, said gun frame having a can positioning portion extending forwardly from said handle and including a pair of opposed can support elements each including a partially circular margin adapted to be received in use in a groove forming a part of a dome and discharge valve portion of a can end, and a combination container cover unit and trigger plate pivotally affixed to a portion of said frame unit and being thereby positioned for movement between an open, can loading position, a normally closed position and a contents discharge position, a trigger carried by said handle and pivotally mounted for movement with respect thereto, a trigger plate actuator disposed on one end of said trigger and adapted to engage a portion of said cover unit and trigger plate, said apparatus further including a mixing unit having a main body portion with a pair of opposed end faces, a central passage extending therethrough between said faces and providing opposed component inlet openings, a spring plate on each end of said main body portion and extending outwardly beyond said end faces and inlet openings, a locating shoulder at the end of each spring plate, and a nozzle receiving portion forming a part of said body and having an outlet passage extending therethrough and intersecting said central passage, and a dispensing nozzle removably secured to said body in registry with said outlet passage, said mixer unit further including a pair of removably positioned inlet elbows, each of said elbows including a vertical tube portion, a horizontal tube portion, and a locating plate extending outwardly from a portion of said horizontal tube, said locating plate having inner and outer surfaces adapted to engage respectively said end faces of said mixer body and said locating shoulder on said spring plate, whereby said elbow may be precisely located with respect to said body, said elbows being thereby disposable in use in positions of registry with the outlets of associated aerosol can valve units, said mixer body having an upper surface disposed in use in opposed facing relation to downwardly directed surface of said trigger plate, whereby, when said trigger is activated, said trigger plate and said mixer are moved downwardly as a unit to actuate said container valves.

2. An improved dispensing gun as defined in claim 1 which further includes a trigger safety unit, said trigger safety unit being positioned for sliding movement relative to said handle between extended and retracted positions, said safety unit including a pair of forward extension units, each including a beveled leading edge portion and an inner elbow support surface, said trigger safety unit in its extended position having its elbow support surface disposed beneath the lower surface of said inlet elbow and engageable therewith so as to prevent downward movement of said elbow.

3. An improved dispensing gun as defined in claim 1 wherein said mixer body is made from a single piece of stiff but resilient thermoplastic material.

4. An improved dispensing gun as defined in claim 1 wherein said inlet elbows and said mixer body are made from different plastic materials.

5. An improved dispensing gun as defined in claim 1 wherein said handle, said frame, said trigger and said mixing and dispensing unit are all made from synthetic plastic materials.

6. An improved dispensing gun as defined in claim 1 wherein the lower surface of each of said spring plates includes a groove for engagement with a portion of the upper surface of the horizontal tube portion of said elbow.

7. A mixing and dispensing gun for aerosol containers comprising, in combination, a container positioning unit, a trigger mechanism and a mixing and dispensing assembly, said container positioning unit comprising, including a center frame portion and opposed carrier plates each having slots formed therein defined by support margins for engagement of a portion of an associated container in a groove between a domed container end portion of and a container valve support assembly, said container positioning unit further including a handle extending outwardly and downwardly from said frame, a trigger mounted for pivotal movement with respect to said handle and including a lower portion adapted to be engaged by the fingers of the user and an upper portion arranged for downward movement when the lower the portion is pulled to the rear, a combination container cover unit and trigger plate mounted for pivotal movement with respect to said positioning unit, said trigger plate having a downwardly directed surface adapted to engage and depress a mixing and dispensing unit positioned therebeneath, said mixing and dispensing assembly including a rigid mixer unit having a main body portion and a pair of removable component inlet elbows, said main body portion including opposed inlet passages and an enlarged diameter outlet passage, a portion of said outlet passage being threaded for reception of an associated discharge nozzle, said main body portion further including positioning and latching plates extending outwardly of said main body and above said inlet passages, each of said elbows including a tubular vertical and a tubular horizontal passage sections and an alignment and latching element having a flat top surface adapted to engage said latching plate, whereby said elbows may be positioned, aligned, inserted and locked within said body.

* * * * *